June 4, 1935.  P. R. BASSETT ET AL  2,003,661
SEARCHLIGHT DIRECTOR
Filed May 16, 1932  4 Sheets-Sheet 1

INVENTORS:
PRESTON R. BASSETT.
FRANK R. HOUSE.
BY
his ATTORNEY.

June 4, 1935.  P. R. BASSETT ET AL  2,003,661
SEARCHLIGHT DIRECTOR
Filed May 16, 1932  4 Sheets-Sheet 2

INVENTORS:
PRESTON R. BASSETT.
FRANK R. HOUSE.
BY
their ATTORNEY.

INVENTORS:
PRESTON R. BASSETT.
FRANK R. HOUSE.
BY
Herbert H. Thompson
ATTORNEY.

June 4, 1935.   P. R. BASSETT ET AL   2,003,661
SEARCHLIGHT DIRECTOR
Filed May 16, 1932   4 Sheets-Sheet 4

INVENTORS:
PRESTON R. BASSETT.
FRANK R. HOUSE.
BY
ATTORNEY.

Patented June 4, 1935

2,003,661

UNITED STATES PATENT OFFICE 2,003,661

SEARCHLIGHT DIRECTOR

Preston R. Bassett, Rockville Centre, and Frank R. House, Baldwin Harbor, N. Y., assignors to Sperry Gyroscope Company, Inc., Brooklyn, N. Y., a corporation of New York Application May 16, 1932, Serial No. 611,448

20 Claims. (Cl. 240—1.2)

This invention relates to apparatus for locating and illuminating aircraft at night so that anti-aircraft gun fire may be directed thereon. The present practice is to employ a sound locating device, such as a binaural sound locator, or other non-optical system of locating the target "blind" and to transmit therefrom to a searchlight the location of the target, after applying certain corrections. Such a system is outlined in the prior application of Frank R. House, one of the joint inventors hereto, now Patent No. 1,976,727, dated October 16, 1934, for Sound locators and computers for aircraft. With such a system, a continuous series of datum points or predicted positions is determined from the direction of the incoming sound with proper corrections applied thereto. It is at this point in the sky that the searchlight beam is directed. However, as there are always certain errors in listening and in the prediction of the target position, it has been found necessary to move the searchlight about the datum positions, so as to search around these positions until the target is found.

Our invention relates particularly to an improvement in the method of searching through a definite limited area around this datum position in a systematic manner so as to scan every point within this area and to make certain that this complete area will be progressively illuminated within a very short interval so as to leave no blind spots in which the plane could be without being flicked by the beam. According to our invention we interpose in the automatic distant control of the searchlight from the comparator a mechanism semi-automatic in character and preferably manually controlled, which causes the searchlight to scan a complete area about the datum position. The area scanned is chosen as the outside limits of error in transmitting the predicted position so that it amounts to a cone of only a few degrees in azimuth and elevation.

Another object of our invention is to provide a means whereby the automatic control of the searchlight from the sound or other non-optical locator may be instantly interrupted at the time the target is sighted during the searching operation and the control transferred to the beam or searchlight operator at the binocular observation or control station.

Another object of the invention is to provide at the comparator or control device, binoculars or a sighting telescope which is kept trained automatically at the same point in the heavens that the searchlight beam is directed so that the observer-operator at the comparator may always have his sight directed in the same direction as the searchlight beam which he is observing and, therefore, be able to pick up instantly the target when flicked by the beam.

Referring to the drawings showing several forms our invention may assume:

Figure 1:
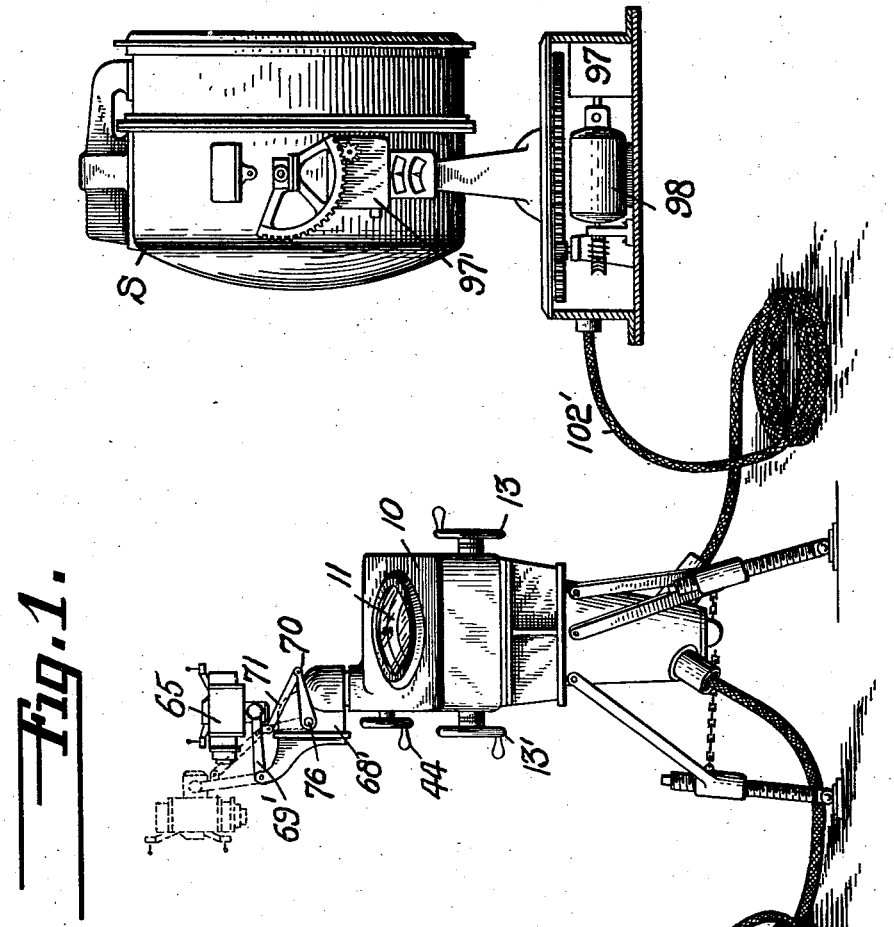
Fig. 1 is a schematic view showing three principal elements of a sound locator searchlight battery, namely, the sound locator, the comparator and the searchlight.
Figure 2:
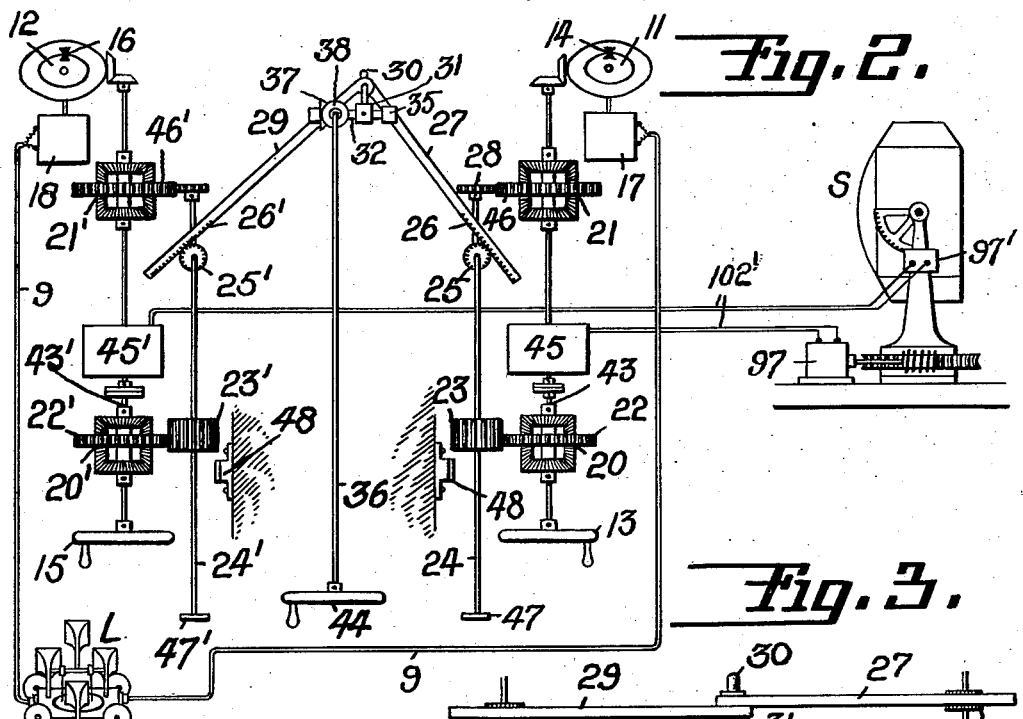
Fig. 2 is a schematic view showing the preferred form of mechanism for a scanning operation.
Figure 3:
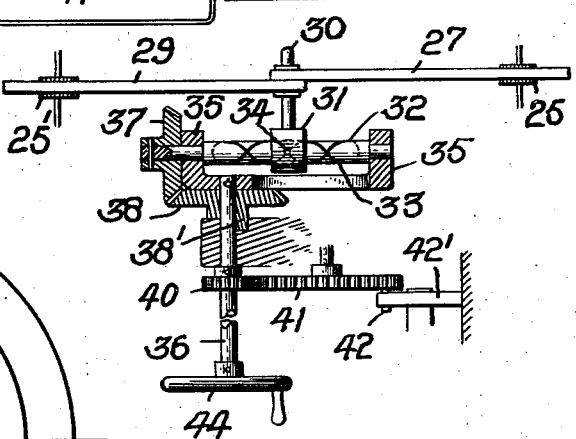
Fig. 3 is a sectional detail of the mechanism whereby the beam is caused to search in an outwardly spiral path from the datum position.
Figure 4:
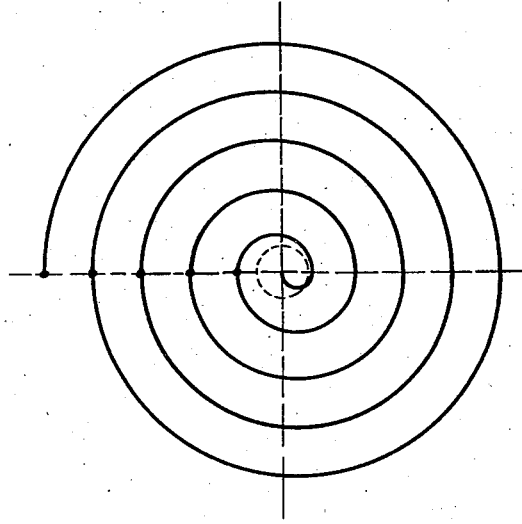
Fig. 4 shows the resulting spiral movement of a searchlight beam.

The sound locator is shown generally at L in Figs. 1 and 2 and preferably consists of a pair of horns A and B spaced apart in azimuth and another pair of horns C and D spaced apart in elevation. There is one operator for each pair of horns, the azimuth operator listening through the ear pieces in the helmet E and the elevation operator listening through the ear pieces in the helmet F. All the horns turn together but the azimuth operator turns them in azimuth through handle G, and the elevation operator similarly controls the horns in elevation through the handle H. The exact positions of the horns in azimuth and elevation are not transmitted, however, but the corrections (more particularly described in the aforesaid prior application) are first introduced through the differentials 6 in azimuth and 7 in elevation, the computing mechanism being located in the base 8 of the sound locator.

From the correction mechanism 8, the azimuth and elevation angles are transmitted through transmitter 80 and 81 and cable 9 to the comparator 10 the upper portion of which is rotatably mounted on its tripod base. This device forms a means by which position of the searchlights is controlled and is usually located at some distance from the searchlight in order to obtain better vision. If desired, the searchlight angles could be automatically transmitted from the sound locator as indicated in Fig. 6, but we have shown in Figs. 1 to 5 the searchlight as controlled through a manual follow-the-pointer system, the azimuth position of the sound locator being transmitted to a dial 11 in the comparator and the elevation to a dial 12. It is, therefore, the duty of the operator of the handwheel 13 to match the outer pointer 14 with the pointer on the dial 11 and it is the duty of the operator of the elevation handwheel 15 to match the outer pointer 16 with the pointer on dial 12. Dials 11 and 12 are controlled respectively from suitable repeater motors 17 and 18 actuated from transmitters 80 and 81 in the base of the sound locator 1.

Referring first to Fig. 2, there is shown interposed between the handle 13 and the dial 14 one or more differentials 20 and 21. Through the center arm of differential 20 is introduced one component of the scanning or searching motion. As shown, the center arm 22 is provided with a spur gear meshing with an elongated pinion 23 on shaft 24. On said shaft is a pinion 25 meshing with rack teeth 26 on a rack bar 27. As shown in Fig. 2, the pinion 25 and the rack teeth are in a plane at right angles to the plane of shaft 24 in order to show these parts in one figure, but it will be understood that the plane of the pinion 25 is readily perpendicular to the paper as is the pinion 28 on the same shaft. A similar pair of differentials 20' and 21' is provided between the elevation handwheel 15 and the elevation dial 16. Likewise a similar shaft 24' is provided, having a pinion 23' meshing with spur gear 22' on the planetary arm of the differential. Shaft 24' is likewise provided with a pinion 25' meshing with rack teeth 26' on a second bar 29 pivoted at its upper end on a common pivot pin 30 with the bar 27. From the center of the two pinions 25 and 25' to the center of the pivot pin 30 constitutes a right angle when the pin is in its central or inoperative position.

Pivot pin 30 is shown mounted on a block 31 which is slidably but non-rotatably mounted on a shaft 32. Said shaft has an endless double spiral groove 33 therein into which projects a pin 34 from the interior of the block 31. Rotation of the shaft 32 will, therefore, cause the block 31 to travel back and forth along the shaft. Shaft 32 is journalled adjacent its ends in a bracket 35 which is secured to a shaft 36 at right angles to the shaft 32 and positioned to one side of the center of the shaft 32. Rotation of the shaft 36 by handwheel 44 will, therefore, revolve the bracket 35 about the center thereof. On shaft 32 is also secured a bevel pinion 37 meshing with a second bevel gear 38 loosely mounted on shaft 36. If gear 38, therefore, is held stationary (as by lug 38') and the bracket 35 revolved, it will readily be seen that the block 31 and its stub shaft 30 will not only be revolved about shaft 36 as a center but will also reciprocate along the shaft 32 by the rolling of the bevel gear 37 around bevel gear 38. If block 31 is started with pin 30 concentric with shaft 36, the revolving of the shaft 36 will cause the pin 30 to execute first an outward spiral and then an inward spiral. In order that the operator may be informed when shaft 36 and pin 30 are concentric, we have shown a pinion 40 on shaft 36 meshing with a large gear 41, the gear ratio being such that one turn of gear 41 equals one complete in and out spiral of pin 30. A pin 42 is shown on the gear designed to snap past a spring click 42' when the shafts 36 and 30 are concentric, so that the operator may know when the beam is in the datum position.

The spiral movements of the pin 30 are resolved into azimuth and elevation components by right angle bars 27, 29 pivoted thereon, the reciprocating movements of said bars being transmitted to pinions 25, 25' respectively and thus through shaft 24, 24' to the differentials 20 and 20'. The third arm of said differential, therefore, turns the output shaft 43 through an angle equal to the algebraic sum of the movements of the handwheel 13 and the scanning mechanism. Obviously automatic means may be used to turn shafts 13 and 36, if desired. Transmitter 45, therefore, on shaft 43 transmits both the datum and scanning movements of the searchlight in azimuth while the corresponding transmitter 45' on the shaft 43' transmits the elevation datum and the scanning movements. The spiral convolutions are made sufficiently close so that no blind area is left within the normal range of the searchlight. Obviously the rotation of the hand wheel 44 may be arrested at any time so that the searching action may be stopped the moment the target is flicked. Also, by having the search made in a definite pattern, the operation may be reversed at any time so that the observer may turn the beam backwardly if desired to pick up the target if he passed it at first.

It is not desirable, however, that the scanning movements should reach the follow-the-pointer dials 11 and 12 as these would disturb the proper operation of the system. Therefore, a second differential 21 (and 21') is interposed in which the planetary arm 46, (46') is operated from the shaft 24, (24') so as to take out the scanning movements after they have been introduced. Such differentials, however, do not interfere with the transmitters 45 and 45'. If it is desired to cut out the scanning mechanism as when synchronizing the searchlight and comparator, the operator may pull out shafts 24 and 24' by knobs 47, 47' thus disconnecting pinions 25 and 25' and bringing the pinions 23, 23' into engagement with stationary gear 48.

Figure 5:
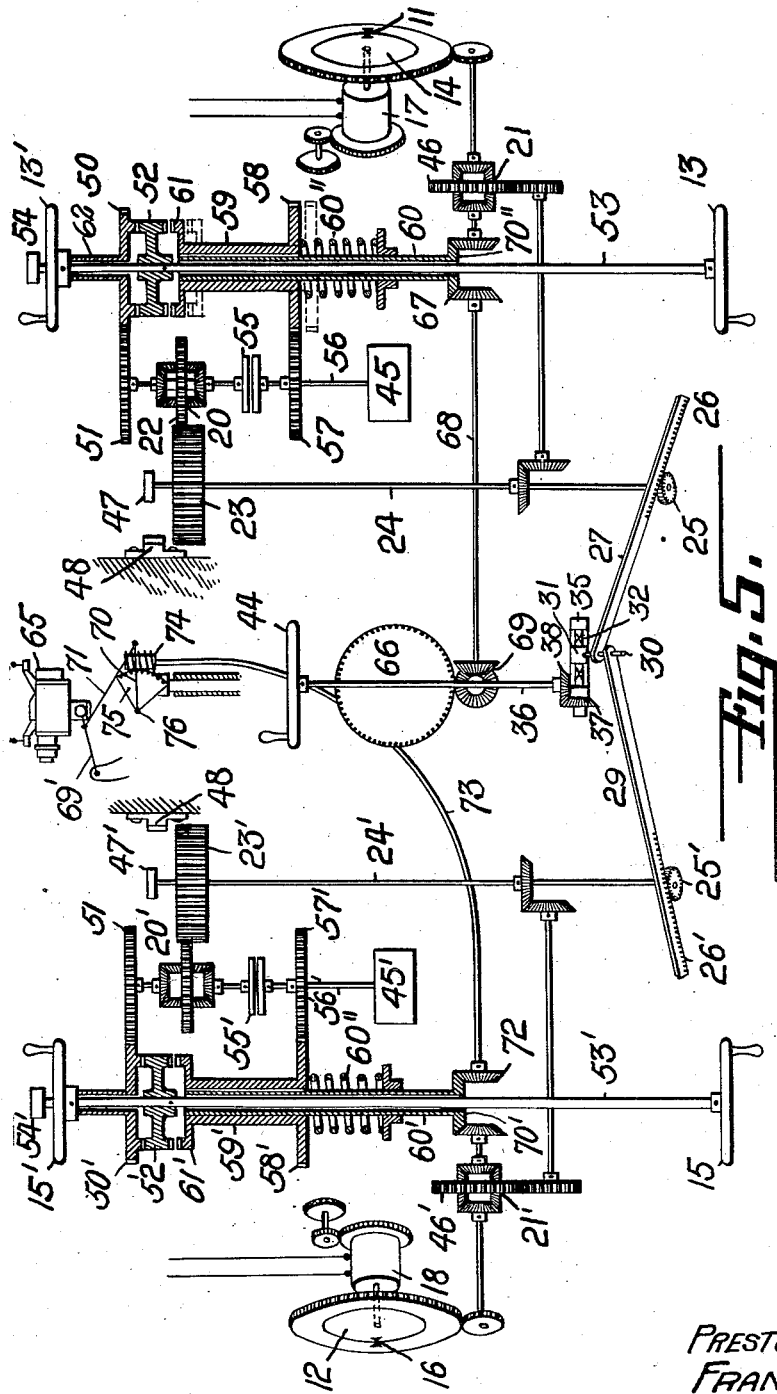
Fig. 5 is a diagrammatic view of the mechanism within the comparator which supplements the showing in Fig. 2.
Figure 6:
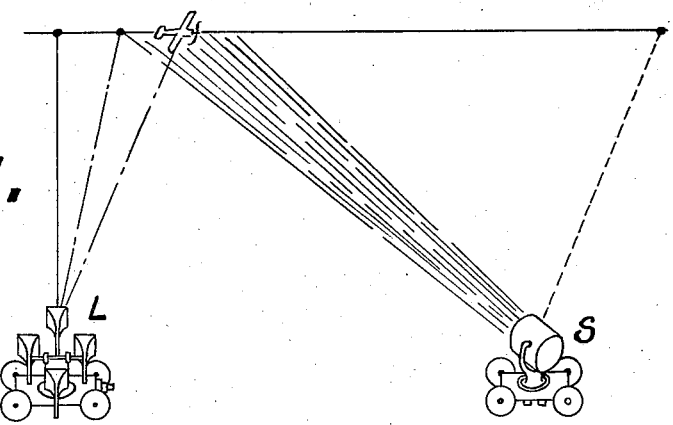
Fig. 6 is a diagrammatic view of a modified form of the invention.

Fig. 5 shows in a somewhat different manner the same mechanism shown in Fig. 2, certain parts, however, being omitted and additional features shown, like parts having the same reference characters. In this figure there are shown additional handwheels 13' and 15' which are operated by the spotter or observer, while the handwheels 13 and 15 are operated solely to match the pointers 11, 14 and 12, 16. Handwheel 13 is shown as mounted on a long shaft 53 to which is pinned a double face clutch member 52. Said shaft 53 is also shown as extending loosely through the hub of the handwheel 13' and is provided at its upper end with a knob 54. When handwheel 13 is rotated with the clutch in the position shown in Fig. 5, gear 50 which is provided with a complementary clutch face is likewise rotated, thus rotating the gear 51 and one arm of the differential 20. As before, the scanning movement is introduced through a shaft 24 and pinion 23 and the resultant movements transmitted through friction clutch 55 to the shaft 56, on which are mounted the transmitter 45 and a gear 57. The latter drives a gear 58 on a sleeve 59 which is slidably but non-rotatably mounted on a long inner sleeve 60. Sleeve 59 is yieldingly held in the position shown in full lines in Fig. 5 by spring 60''. If, however, the knob 54 be pushed inwardly, clutch 52 is disengaged from gear 50 and brought into engagement with the clutch face 61 on the upper end of the sleeve 59, also pushing the sleeve 59 downwardly into dotted line position in Fig. 5. This movement first disconnects the handle 13 from the control of the transmitter 45 and also disconnects the gears 57 and 58 so that the handwheel 13 no longer has control of the pointer 14. Rotation of the handwheel 13' under these circumstances will directly drive the gear 50 through the sleeve 62 thus driving the transmitter 45 therefrom without turning the pointer 14 or the binoculars connected therewith as hereinafter described. This control is mainly used when synchronizing the searchlight and comparator or the sound locator and comparator. The elevation control is similar through the handwheels 15 and 15', corresponding parts being shown by primed reference characters.

The operation of this portion of the invention is that the operators of the handwheels 13 and 15 control the searchlight beam by matching pointers until the target is sighted, the observer at this time rotating handwheel 44 to operate the scanning mechanism. When the target is sighted through the binoculars, the observer releases the handwheel 44 and assumes direct control through handwheels 13' and 15' preferably without pushing the knobs 54 and 54' inwardly. Buttons 47, 47' may be pulled upwardly at the same time so that the scanning device is also rendered inoperative, although this is unnecessary as handwheel 44 is idle. The searchlight is controlled from the azimuth and elevation transmitters 45 and 45' which turn the searchlight through repeater motors 97 and 97', which may be employed either with or without power multiplying motors 98 (Fig. 1).

We also prefer to mount the binoculars on the comparator in such a manner that they are maintained in the direction of the searchlight beam. For this purpose the binocular 65 is mounted directly on the comparator 10 and since the comparator rotates and oscillates in azimuth as the handwheels 13 and 14 are turned, the proper position in azimuth is maintained by the binoculars. This is represented in Fig. 5 by connecting the sleeve 60 to the large gear 66 which carries the upper or rotatable portion of the comparator, gear 66 being shown as rotated from the sleeve 60 through bevel gear 67, shaft 68 and bevel gear 69. For movements in elevation the binoculars are shown as mounted on a linkage system pivoted to the block 68'. There are shown two parallel links 69', 70 pivoted on the block and connected by a cross link 71. The binoculars proper are fixed to the upper lever 69' so that when the linkage is revolved or oscillated in counter-clockwise direction in Fig. 1, the binocular is tilted upwardly as shown in dotted lines. The tilting movement of the binoculars is shown as governed by the rotation of the sleeve 60'. As shown, the sleeve 60' is connected through bevel gear 70', 72 to flexible shaft 73 on which is a worm 74 meshing with a worm sector 75. The latter is mounted on the shaft 76 of the lever 70 so that the lever rocks with the worm. Therefore, the binoculars automatically follow not only the main movements of the searchlight but also the scanning movements as long as the handle 44 is rotated and buttons 47 and 47' remain down. This is highly desirable as the observer is then unconscious that either the searchlight beam or the binoculars are oscillating since they are kept directly together at all times, the binocular being directed at the same point in the heavens as the searchlight.

Figure 7:
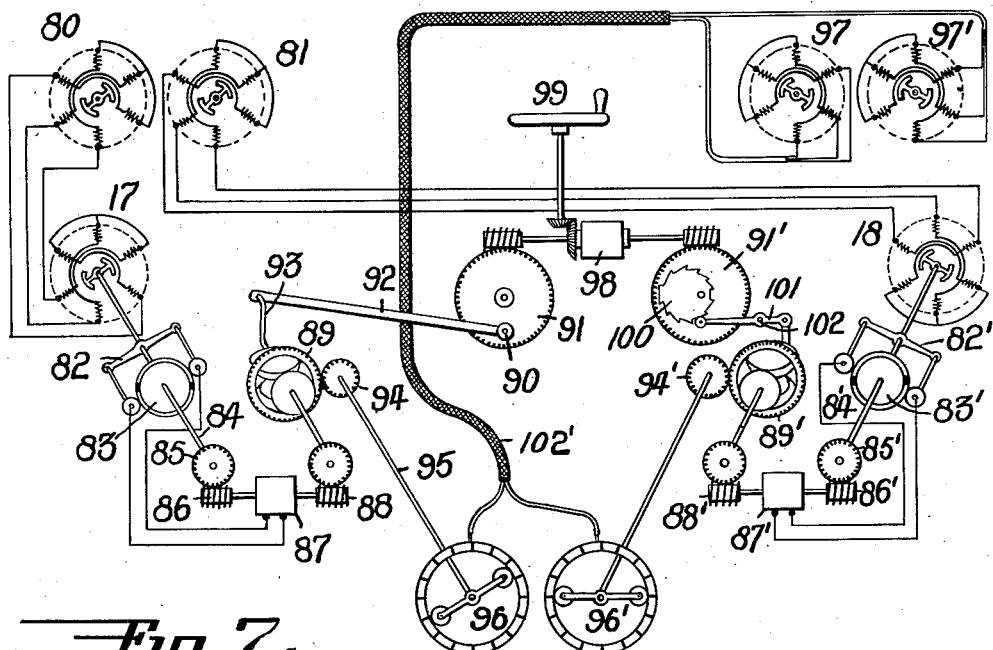
Fig. 7 is a diagram showing the path of movement of the searchlight beam resulting from the form of the invention shown in Fig. 6.

In Fig. 6 both a modified form of the scanning device and searchlight control is shown. In this figure the azimuth and elevation transmitters at the sound locator are again shown at 80 and 81. In this case instead of showing a follow-the-pointer system, we have shown a complete automatic follow-up system in which the searchlight is automatically driven from the sound locator without human follow-ups. For this purpose the repeater motor 17 is shown as turning one portion 82 of a reversing controller, i. e., the revolving trolleys or brushes for the reversing contactor segment 83 (both shown diagrammatically). The latter is mounted on a shaft 84 driven from a wormwheel 85 turned from a worm 86 on the shaft of a reversible power motor 87. The power motor, therefore, drives the contacting segment into coincidence with the position of the trolleys. The power motor also operates to position the searchlight in azimuth. For this purpose it is shown as driving through worm gearing 88 one arm of a differential gear train 89. Through the opposite arm of the same is introduced the scanning movement. In this instance a continuous rotation of a crank pin 90 on a gear 91 reciprocates connecting rod 92 and the crank 93 connected to the third arm of said differential. From the planetary arm is taken off the final movement of the searchlight through the pinion 94 which turns through shaft 95 the transmitter 96. Said transmitter operates the powerful repeater motor 97 at the searchlight for turning the same. The scanning movement may be either power driven through a motor 98 or controlled by hand through a handwheel 99, or both. In elevation the control may be similar except that in this case the scanning movement is such as to cause the searchlight beam to scan the desired field of movement by a series of advancing step-by-step or receding movements, the final effect being to move the beam as indicated in Fig. 7. For this purpose there is mounted on the shaft of the gear 91' driven from motor 98 or handwheel 99 an eccentric cam 100 having radially laid-out steps or teeth to give the required movements to the cam lever 101 pivoted at 102. Said lever rocks the third arm of the differential 89', and the combined movement turns elevation transmitter 96', which operates transmitter 97 through cable 102'.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a preliminary positioning system for searchlights, means for approximately locating a target by non-optical means, remote control means for directing the searchlight therefrom, and means for introducing at will within said directing means an additional to and fro motion to cause said searchlight to scan a predetermined area around said location until the target is picked up.

2. In a preliminary positioning system for anti-aircraft searchlights, a means for continuously positioning the searchlight in azimuth and elevation including means for transmitting the anticipated position of the searchlight in azimuth and elevation and means for introducing into said last named means an oscillatory motion to cause said searchlight to systematically scan a predetermined area around said anticipated position to pick up the target.

3. In a combined blind-searchlight system for locating aerial targets at night, the combination with a non-optical locator and searchlight, of means controlled from said locator and remote from the searchlight for directing the latter at the target as indicated by said locator, a sight at said means, and means connecting said sight and first named means to maintain said sight pointed at the target.

4. In a remote control for searchlights, means for positioning the searchlight in the anticipated position in azimuth and elevation, a sight for following the target, means for causing said searchlight to scan a predetermined area around said position to flick the target, and means for causing said sight to follow all movements of the searchlight.

5. In a sound locator system for initially positioning searchlights, the combination with a sound locator, control station and searchlight, of means actuated from the control station for maintaining the searchlight pointed at the target as indicated by the sound locator and means at the control station for superimposing on such motion a limited systematic scanning motion to cause the searchlight to scan an area around the indicated position at least equal to the ordinary limits of error of the sound locator.

6. In a sound locator comparator system for positioning searchlights, the combination with a sound locator, comparator and searchlight, means actuated by the sound locator for actuating indicators at the comparator, means at the comparator for introducing a limited scanning movement, means for transmitting the combined indicated and scanning movements, and means for preventing the scanning movements from affecting said indicators.

7. In a sound locator comparator system for positioning searchlights, the combination with a sound locator, comparator and searchlight, means actuated by the sound locator for actuating relative position indicators at the comparator, a plurality of manual means at the comparator governing the searchlight, certain of said means being operated by match-the-pointer operators to maintain the proper relation between said relative position indicators, another of said means being initially operated by the target observer to superimpose a scanning movement, and another of said means for operation by the observer after the target is sighted whereby the searchlight control may be transferred from said pointer operators and from said scanning means to said last-named control means when the target is once sighted.

8. In a sound locator comparator system for positioning searchlights, the combination with a sound locator, comparator and searchlight, means actuated by the sound locator for actuating relative position indicators at the comparator, means at the comparator for introducing a limited scanning movement, a plurality of manual means at the comparator for governing the searchlight, certain of said means being operated by match-the-pointer operators to maintain the proper relation between said relative position indicators and others of said means being operated by target observer, and means whereby said observer may cut out said scanning movement and transfer the searchlight control from said pointer operators to the observer when the target is once sighted.

9. In a remote control for searchlights, means for positioning the searchlight in a predicted position in elevation and azimuth including means for transmitting said predicted position in azimuth, means for transmitting said predicted position in elevation, and means for introducing into each of said means simultaneously a continuously increasing to and fro motion whereby said searchlight is caused to move in an outwardly expanding spiral around said predicted position of sufficiently close convolutions to leave no blind area within the normal range of the searchlight.

10. In a remote control for searchlights, means at the control station for setting up the indicated azimuthal position of the searchlight beam, means for setting up the elevation angle, and means for introducing at the control station a supplementary scanning movement in the searchlight comprising a member, means for revolving said member in a spiral path, means for resolving the movements of said member into right angular components, and azimuth and elevation transmitting means each actuated jointly by said azimuth and elevation positioning means and the corresponding components of said scanning means.

11. In a remote control for anti-aircraft searchlights, means for indicating the approximate position of the aircraft, primary transmitting means for directing said searchlight in both azimuth and elevation toward said position, and manual means operable at will for introducing a comparatively rapid to and fro component in one of said transmitting means and a slower motion in the other of said means, whereby the beam is caused to search in a progressive zigzag fashion.

12. In a remote control for searchlights, means for transmitting the azimuthal position to the searchlight, means for transmitting the elevation angle, and means for introducing a supplementary scanning movement in each of said transmitting means comprising means for introducing a constant reciprocatory movement in one of said transmitting means about said position, and means for causing a step-by-step progressive movement in said other transmitting means.

13. In a remote control for searchlights, means for transmitting the azimuthal position to the searchlight, means for transmitting the elevation angle, and means for introducing a supplementary scanning movement in the searchlight comprising a member, means for revolving said member in a spiral path, means for resolving the movements of said member in two right angular components, means for introducing said components into said azimuth and elevation transmitting means respectively, and means for indicating when said member is at the center or origin of its spiral.

14. In a combined blind-searchlight system for locating aerial targets at night, the combination with a non-optical locator and searchlight, of means controlled from said locator and remote from the searchlight for directing the latter at the target as indicated by said locator, a sight at said means, means connecting said sight and first-named means to maintain said sight pointed at the target, and means whereby the sight observer may assume control of the searchlight upon the target being flicked.

15. In a remote control for searchlights, means for positioning the searchlight in the anticipated position in azimuth and elevation, a sight for following the target, means for causing said searchlight to scan a predetermined area around said position to flick the target, means for causing said sight to follow all movements of the searchlight, and means whereby the sight observer may assume control of the searchlight upon the target being flicked.

16. In a non-optical locator comparator system for positioning searchlights, the combination with a non-optical locator, comparator and searchlight, means actuated by the locator for actuating indicators at the comparator, means at the comparator for introducing a limited scanning movement, and means for transmitting the combined indicated and scanning movements.

17. In a sound locator comparator system for positioning searchlights, the combination with a sound locator, comparator and searchlight, means actuated by the sound locator for actuating indicators at the comparator, means at the comparator for introducing a limited scanning movement, means for transmitting the combined indicated and scanning movements, means for preventing the scanning movements from affecting said indicators, and means whereby the searchlight may be controlled directly from said comparator without interference from any of said other means.

18. In a remote control system for searchlights, a sight, a frame on which the same is mounted for movements in elevation, a support in which said frame is pivoted for turning in azimuth, handwheels for moving said sight in azimuth and elevation, transmitters actuated by said handwheels, and repeater motors at the searchlight actuated from said transmitters for maintaining the sight and beam pointed at a common point in the heavens.

19. In a remote control system for searchlights, a sight, a frame on which the same is mounted for movements in elevation, a support in which said frame is pivoted for turning in azimuth, handwheels for moving said sight in azimuth and elevation both mounted for revolution in azimuth with said frame, transmitters actuated by said handwheels, and repeater motors at the searchlight actuated from said transmitters for maintaining the sight and beam pointed at a common point in the heavens and whereby the operator-observer always faces toward the searchlight beam.

20. In a non-optical locator system for initially positioning searchlights, the combination with a non-optical locator, control device and searchlight, of means actuated from the control device for maintaining the searchlight pointed at the target as indicated by said locator, and means at the control device for superimposing on said motion a limited systematic scanning motion to cause the searchlight to scan an area around the indicated position, said means permitting said scanning motion to be stopped or reversed from the control device at will.

PRESTON R. BASSETT.
FRANK R. HOUSE.